US010482327B1

(12) United States Patent
Ouimet et al.

(10) Patent No.: US 10,482,327 B1
(45) Date of Patent: Nov. 19, 2019

(54) MEDIA OVERLAY SELECTION SYSTEM

(71) Applicant: Snap Inc., Venice, CA (US)

(72) Inventors: Kirk Ouimet, Orem, UT (US); Yunchao Gong, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 96 days.

(21) Appl. No.: 15/801,853

(22) Filed: Nov. 2, 2017

Related U.S. Application Data

(60) Provisional application No. 62/447,693, filed on Jan. 18, 2017.

(51) Int. Cl.
| | | |
|---|---|---|
| *G06K 9/00* | (2006.01) | |
| *G06K 9/64* | (2006.01) | |
| *G06T 11/60* | (2006.01) | |
| *G06T 7/55* | (2017.01) | |
| *H04L 12/58* | (2006.01) | |

(52) U.S. Cl.
CPC ........... *G06K 9/00671* (2013.01); *G06K 9/64* (2013.01); *G06T 7/55* (2017.01); *G06T 11/60* (2013.01); *G06K 2209/27* (2013.01); *H04L 51/08* (2013.01)

(58) Field of Classification Search
CPC combination set(s) only.
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |

(Continued)

FOREIGN PATENT DOCUMENTS

CA 2887596 7/2015

OTHER PUBLICATIONS

Leyden, John, "This SMS will self-destruct in 40 seconds", [Online]. Retrieved from the Internet: URL: http://www.theregister.co.uk/2005/12/12/stealthtext/, (Dec. 12, 2005), 1 pg.

*Primary Examiner* — Jose L Couso
(74) *Attorney, Agent, or Firm* — Schwegman Lundberg & Woessner, P.A.

(57) ABSTRACT

A computing system receives, from a client device, image data describing an image captured by an optical sensor of the client device. The computing system compares the image to a set of reference images that include associated metadata describing a real-world feature depicted by the respective reference image. The computing system determines, based on the comparison, a subset of reference images that are similar to the image, and then determines, based on associated metadata of the subset of reference images, that the image captured by the optical sensor of the client device depicts a first real-world feature. The computing system selects a subset of media overlays related to the first real-world feature based on metadata associated with each media overlay that describes the respective media overlay. The computing system transmits the subset of media overlays to the client device.

20 Claims, 15 Drawing Sheets

(56) References Cited

U.S. PATENT DOCUMENTS

| | | | |
|---|---|---|---|
| 8,724,622 B2 | 5/2014 | Rojas | |
| 8,874,677 B2 | 10/2014 | Rosen et al. | |
| 8,909,679 B2 | 12/2014 | Roote et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,177,225 B1* | 11/2015 | Cordova-Diba | G06T 5/00 |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,510,051 B1* | 11/2016 | Bostick | H04N 21/4668 |
| 2011/0202598 A1 | 8/2011 | Evans et al. | |
| 2012/0209924 A1 | 8/2012 | Evans et al. | |
| 2013/0014155 A1* | 1/2013 | Clarke | G11B 27/105 |
| | | | 725/32 |
| 2015/0095310 A1* | 4/2015 | Beaurepaire | G06F 3/0484 |
| | | | 707/722 |
| 2015/0128014 A1* | 5/2015 | Monroe | G06F 3/0482 |
| | | | 715/202 |
| 2015/0317836 A1* | 11/2015 | Beaurepaire | G09G 5/14 |
| | | | 345/634 |
| 2016/0093106 A1* | 3/2016 | Black | G06K 9/00624 |
| | | | 345/633 |
| 2016/0253710 A1* | 9/2016 | Publicover | H04W 4/21 |
| | | | 705/14.66 |
| 2018/0367484 A1* | 12/2018 | Rodriguez | H04L 51/063 |

* cited by examiner

1100

DETERMINE A PERCENTAGE OF THE REFERENCE IMAGES THAT ARE ASSOCIATED WITH METADATA INDICATING THAT THE RESPECTIVE REFERENCE IMAGES DEPICT THE SAME REAL-WORLD FEATURE
1102

COMPARE THE PERCENTAGE TO A THRESHOLD PERCENTAGE
1104

DETERMINE THAT THE PERCENTAGE MEETS OR EXCEEDS THE THRESHOLD PERCENTAGE
1106

FIG. 11

MEDIA OVERLAY SELECTION SYSTEM

CROSS-REFERENCE TO RELATED APPLICATIONS

The present application claims the benefit of priority of U.S. Provisional Application No. 62/447,693, filed on Jan. 18, 2017, U.S., which is incorporated herein by reference in its entirety.

TECHNICAL FIELD

Embodiments of the present disclosure relate generally to selecting media overlays. More particularly, but not by way of limitation, embodiments of the present disclosure relate to selecting a filtered set of media overlays based on real-world features identified in an image.

BACKGROUND

Current applications allow users to capture and alter images. For example, some applications provide users with a set of features that the user can use to alter the captured image by adjusting colors, applying filters, overlaying additional content on the image, etc. While providing a large set of features can be beneficial to a user, it can also be costly with regard to resource usage and cause overall system latency. For example, a large set of content that may be overlaid over an image uses considerable memory. This becomes particularly problematic when using mobile computing devices that generally include limited memory to store data. Providing large data sets is also problematic to the end user that may become overwhelmed with the large data set, finding it hard to find relevant content for use with a captured image. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 11 is a flowchart illustrating a method to determine the real-world feature captured in an image, according to certain example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

DRAWINGS

Figure 1:
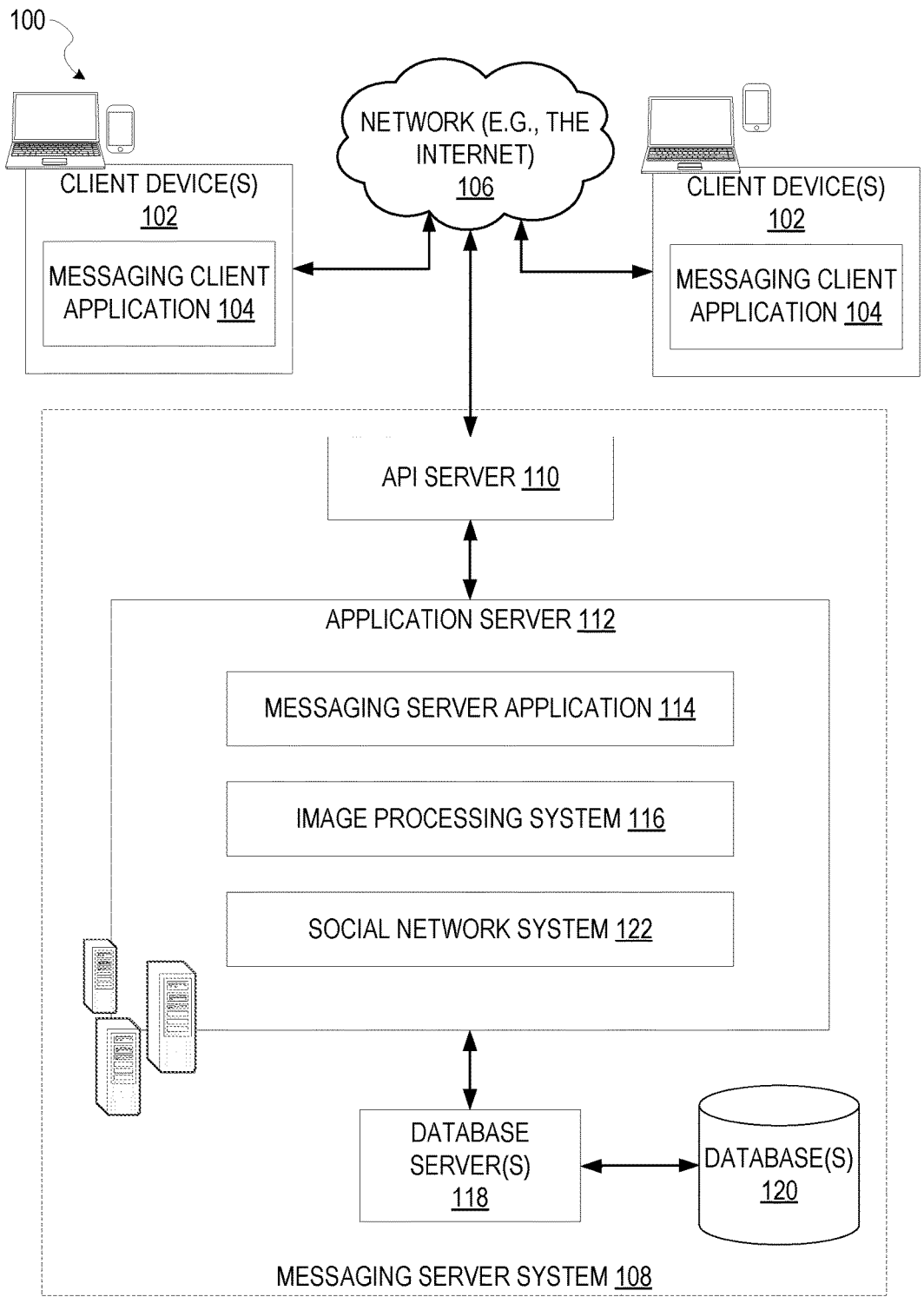
FIG. 1 is a block diagram showing an example messaging system to exchange data (e.g., messages and associated content) over a network.

FIG. 1 is a block diagram showing an example messaging system 100 to exchange data (e.g., messages and associated content) over a network. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by, the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114; and, for possible access by another messaging client application 104, the setting of a collection of media data (e.g., story); the retrieval of a list of friends of a user of a client device 102; the retrieval of such collections; the retrieval of messages and content; the adding and deletion of friends to a social graph; the location of friends within a social graph; and opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. For example, the image processing system 116 uses image processing operations to identify one or more real-world features captured in an image. A real-world feature is any type of item or feature captured in an image. Examples of real-world features include physical objects, such as people, bottles, automobiles, storefronts, signs, etc. Additional examples of real-world features include features that describe a context of the image, such as the weather (e.g., sunny, rainy etc.) or time of year (e.g., fall, spring, etc.).

The image processing system 116 uses a set of reference images to identify real-world features in an image. The set of reference images is stored in the database 120. Each reference image is associated with metadata describing a real-world feature captured by the reference image. The metadata includes metadata indicating what the real-world feature is, as well as categorization data describing one or more categories with which the real-world feature is associated. For example, a reference image of a shoe is associated with metadata indicating that the reference image is of a shoe, as well as categorization data describing categories associated with the shoe, such as apparel, footwear, sporting goods, basketball, running, Nike, Adidas, etc. As another example, a reference image of a guitar is associated with metadata indicating that the reference image is of a guitar, as well as categorization data describing categories associated with the guitar such as music, musical instrument, acoustic, electric, rock, jazz, Fender, Gibson, etc.

The image processing system 116 operatively compares an image to the reference images in the database 120 to identify real-world features in the image. For example, the image processing system 116 compares an image to one or more reference images to identify reference images that are similar to the image. The image processing system 116 generates vectors representing the images and uses distance functions to identify vectors that are close to each other, indicating that their corresponding images are the same or similar. Each vector includes a set of numeric values that represent elements of the image. For example, the numerical values may represent an intensity value of each pixel of the image. Other examples of elements include color components, length, area, circularity, gradient magnitude, gradient direction, the gray-level intensity value, etc.

The image processing system 116 generates a target vector based on an image received from a client device 102 and compares the target vector to a set of reference vectors representing the reference images. The reference images and the reference vectors are stored in the database 120. The image processing system 116 uses any known distance function to determine the distance between the target vector and the reference vectors. The image processing system 116 identifies the reference vectors that are closest and/or within a threshold distance of the target vector. The reference images represented by the identified reference vectors are determined to be similar to the target image.

Once the image processing system 116 has identified one or more reference images that are similar to the image, the image processing system 116 uses metadata associated with the identified reference images to determine real-world features included in the image. For example, a reference image associated with metadata indicating that the reference image is of a guitar is used to determine that the image is also of a guitar. Additionally, categorization data associated with the reference image is used to categorize the image.

In some instances, a reference image determined by the image processing system 116 to be similar to the image may in fact be of a real-world feature that is different than the real-world feature captured in the image. To avoid incorrectly identifying real-world features in an image, the image processing system 116 determines whether a threshold number or threshold percentage of similar reference images provide consistent metadata to determine the real-world feature included in the image. For example, to determine that an image is of a shoe, the image processing system 116 determines whether at least three reference images determined to be similar to the image include metadata indicating that the reference image is of a shoe. As a result, a single incorrectly identified reference image will not cause the image processing system 116 to incorrectly identify the real-world feature in the image.

As another example, the image processing system 116 determines whether a threshold percentage of the identified reference images include consistent metadata describing the real-world feature in the reference image. For example, the image processing system 116 determines whether at least 50% of the reference images identified as being similar to the image include consistent metadata to cause the image processing system 116 to determine that the image includes the same real-world feature. Thus, if the image processing system 116 identifies ten reference images as being similar to an image, and at least five of the ten reference images are identified as being of a guitar, the image processing system 116 determines that the image also is of a guitar.

In some embodiments, the image processing system 116 compares an entire image to reference images to determine real-world features included in the image. Alternatively, the image processing system 116 compares a portion of the image to the reference images to determine real-world features included in the portion of the image. For example, the image processing system 116 divides an image into portions and compares each individual portion to the reference images. In some embodiments, the image processing system 116 divides the image in a predetermined manner, such as dividing the image into equal halves, quarters, etc.

In some embodiments, the image processing system 116 divides an image based on potential real-world features determined to be captured in the image. For example, the image processing system 116 analyzes an image for changes in color or shading to identify boundaries of potential real-world features included in the image. The image processing system 116 then extracts a portion of the image based on the identified boundaries and compares the extracted portion to the reference images to determine the real-world feature captured in the extracted portion of the image.

Although use of reference images is described as being used by the image processing system 116 to determine real-world features included in an image, this is just one example and not meant to be limiting. The image processing system 116 can use any known technique to analyze images and identify real-world features in the image, and this disclosure envisions use of any such techniques.

Once the image processing system 116 has identified one or more real-world features in an image, the messaging server system 108 selects and provides a user with media overlays for use with the image based on one or more of the real-world features. For example, the messaging server system 108 selects one or more media overlays based on the identified real-world features and provides the selected media overlays to a client device 102 of the user. Selecting media overlays based on the real-world features included in an image is described in greater detail below.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
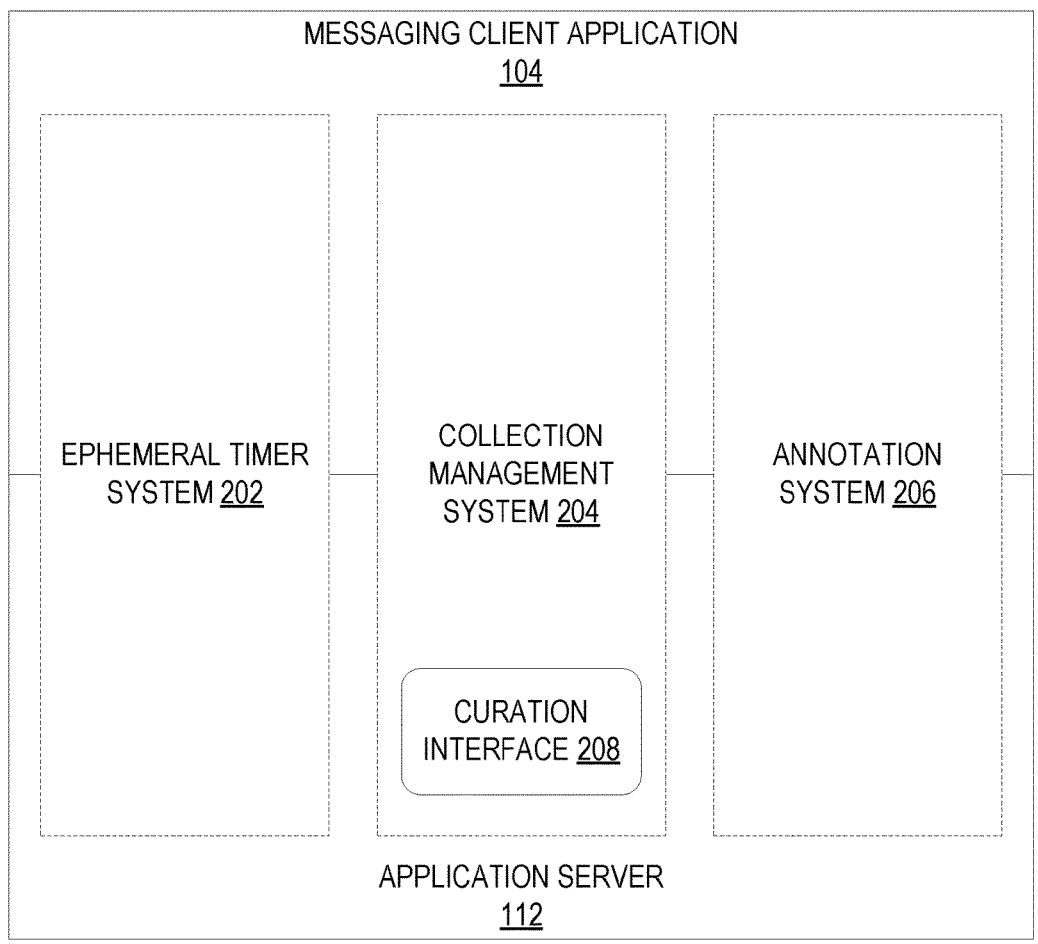
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter, digital sticker, etc.) to the messaging client application 104 based on a geolocation of the client device 102. In another example, the annotation system 206 operatively supplies a media overlay to the messaging client application 104 based on other information, such as social network information of the user of the client device 102, sensor data received from the client device 102, real-world features identified in an image captured by an optical sensor of the client device 102, etc. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of an image (e.g., photograph) captured by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some embodiments, the annotation system 206 uses real-world features identified in an image to identify media overlays to provide to a user. For example, a real-world feature identified in an image can be a physical object such as a guitar, automobile, snowboard, etc., and the annotation system 206 identifies media overlays based on the identified physical object. For instance, the annotation system 206 identifies media overlays that depict the identified physical object in the image. Thus, in response to determining that an image includes a real-world feature that is a guitar, the annotation system 206 identifies media overlays depicting guitars. As another example, the annotation system 206 identifies media overlays that depict shoes for an image determined to include a real-world feature that is a shoe. Utilizing real-world features captured in the image to select a subset of targeted media overlays to provide to a user reduces resource usage. For example, rather than providing the user with the entire set of media overlays, which would use considerable resources to transmit and store, the annotation system 206 provides the user with a subset of targeted media overlays that is smaller than the entire set. The resources used to store and transmit the subset of targeted media overlays is less than what would have been used to store and transmit the entire set.

In some embodiments, the annotation system 206 identifies media overlays that depict images that are related to real-world features included in the image. The annotation system 206 uses categorization data associated with a real-world feature to identify media overlays that are within the same or similar category. For example, a real-world feature such as a guitar is generally categorized under music, and the annotation system 206 selects a media overlay that is also categorized under music, such as a media overlay depicting an image of a musical note, piano, drum set, rock band, etc. As another example, a real-world feature such as a basketball is generally categorized under sports, and the annotation system 206 selects media overlays that are also categorized under sports, such as media overlays depicting a football, scoreboard, stadium, foam finger, etc. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation, a real-world feature, etc., via a bidding process. For example, the annotation system 206 associates the media overlay of a highest bidding merchant with a corresponding geolocation, real-world feature, determined image context, etc., for a predefined amount of time.

Figure 3:
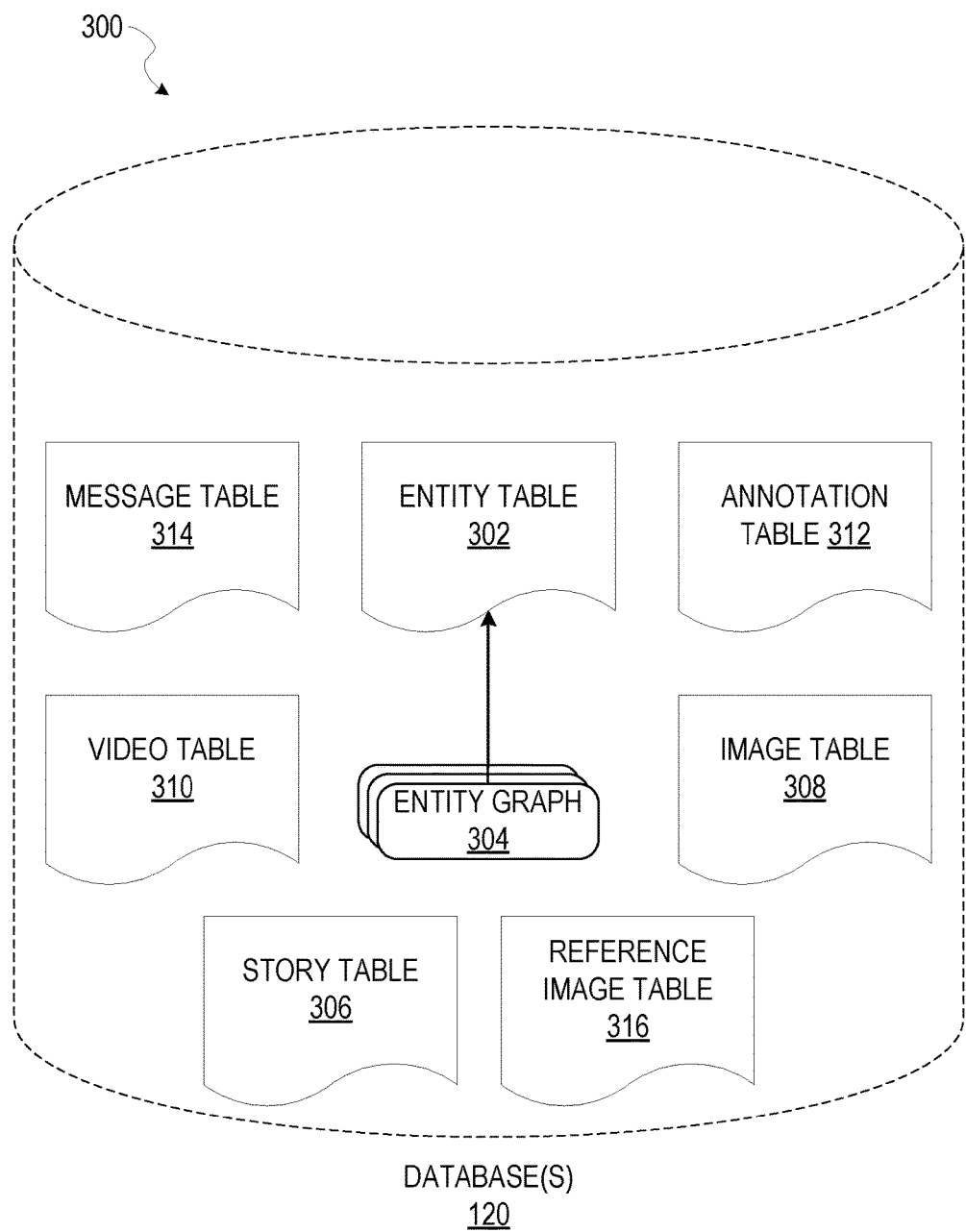
FIG. 3 is a schematic diagram illustrating data which may be stored in the database of the messaging server system, according to certain example embodiments.

FIG. 3 is a schematic diagram 300 illustrating data which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based.

The database 120 also stores annotation data, in the example form of filters and media overlays, in an annotation table 312. Filters and media overlays, for which data is stored within the annotation table 312, are associated with and applied to videos (for which data is stored in a video table 310) and/or images (for which data is stored in an image table 308). In one example, an image overlay can be displayed as overlaid on an image or video during presentation to a recipient user. For example a user may append a media overlay on a selected portion of the image, resulting in presentation of an annotated image that includes the media overlay over the selected portion of the image. In this way, a media overlay is used as a digital sticker that a user uses to annotate or otherwise enhance the images they capture (e.g., photographs).

Each stored media overlay is associated with metadata describing the media overlay. For example, the media overlay is associated with metadata describing a physical item or action depicted by the media overlay, such as a guitar, shoes, running, etc. The metadata also includes categorization data describing one or more categories associated with the media overlay. For example, a media overlay depicting an image of a guitar is associated with categories such as music, rock and roll, musical instruments, etc. In some embodiments, the categorization data includes various levels of categories associated with a media overlay. For example, the categorization data identifies a general categorization for a media overlay that describes the media overlay at a high level, as well as one or more specific categorization levels that describe the media overlay with greater specificity. For example, a media overlay depicting a guitar is assigned a general categorization of music, and more specific categorizations such as musical instruments, guitars, electric guitars, etc. The categorization data also includes a contextual categorization of a media overlay that describes a context with which the media overlay is associated. For example, a contextual categorization such as a sunny day includes media overlays depicting images such as beach balls, hot dogs, baseball, etc.

Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices have location services enabled and are at a common location event at a particular time, may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 also stores reference images in the reference image table 316. Each reference image includes a captured image (e.g., photograph) of a real-world feature. Each reference image includes metadata describing the reference image, such as metadata indicating the real-world feature captured by the reference image as well as categorization data describing one or more categories associated with the reference image. Categorization data includes general categorization and various level of specific categorization for the reference image. The categorization data also include a contextual categorization of the reference image.

Figure 4:
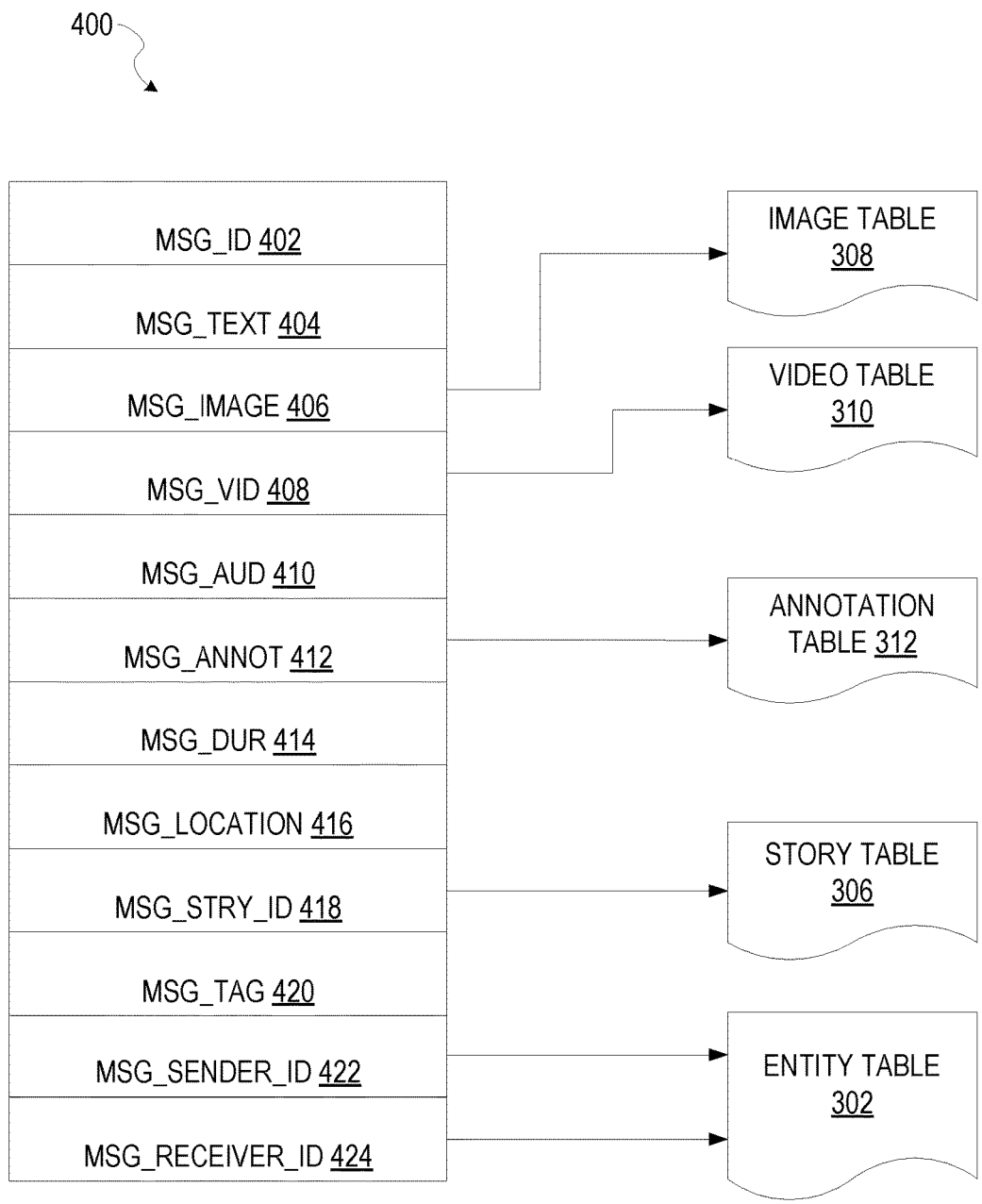
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, which is accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
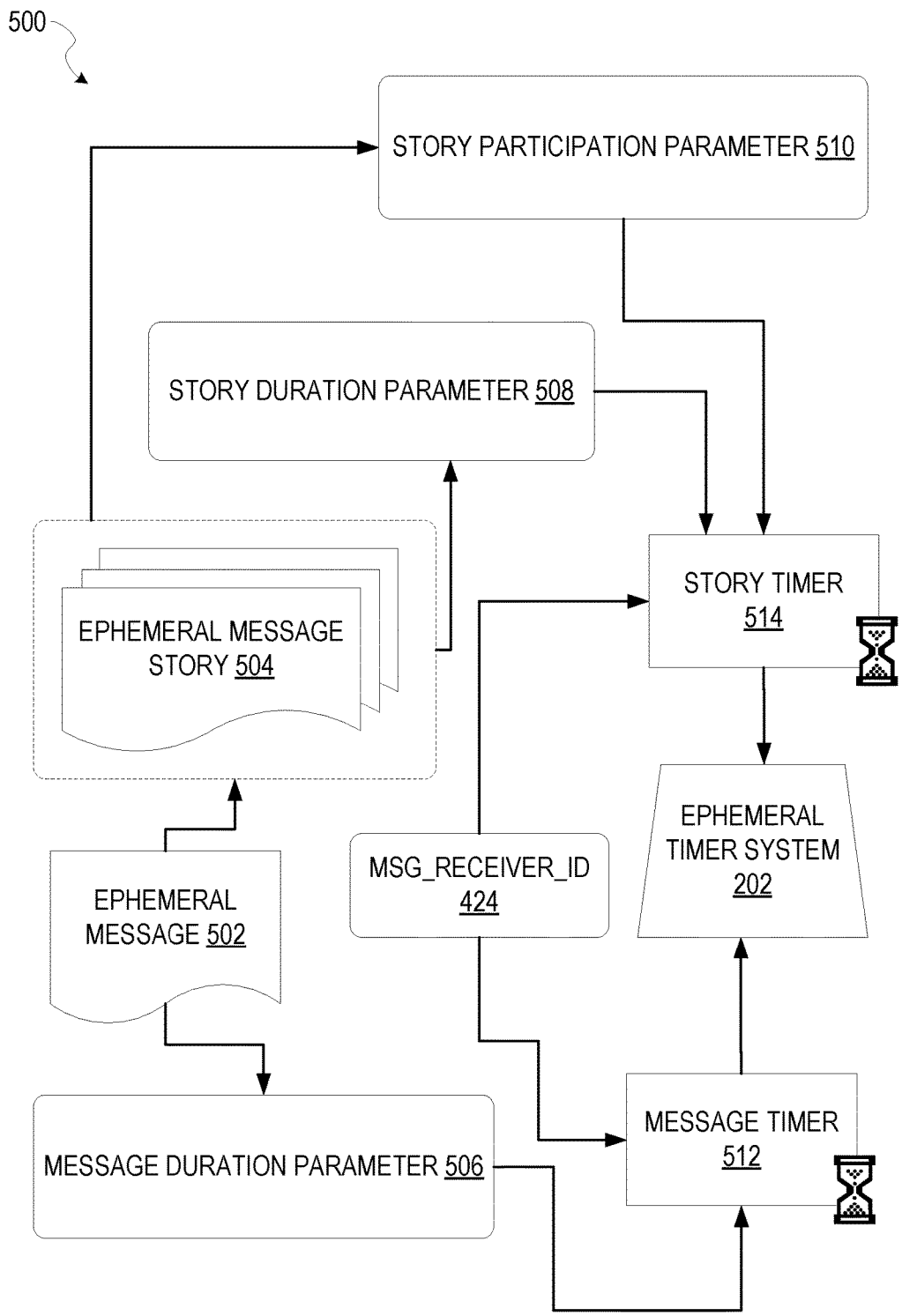
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system

202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
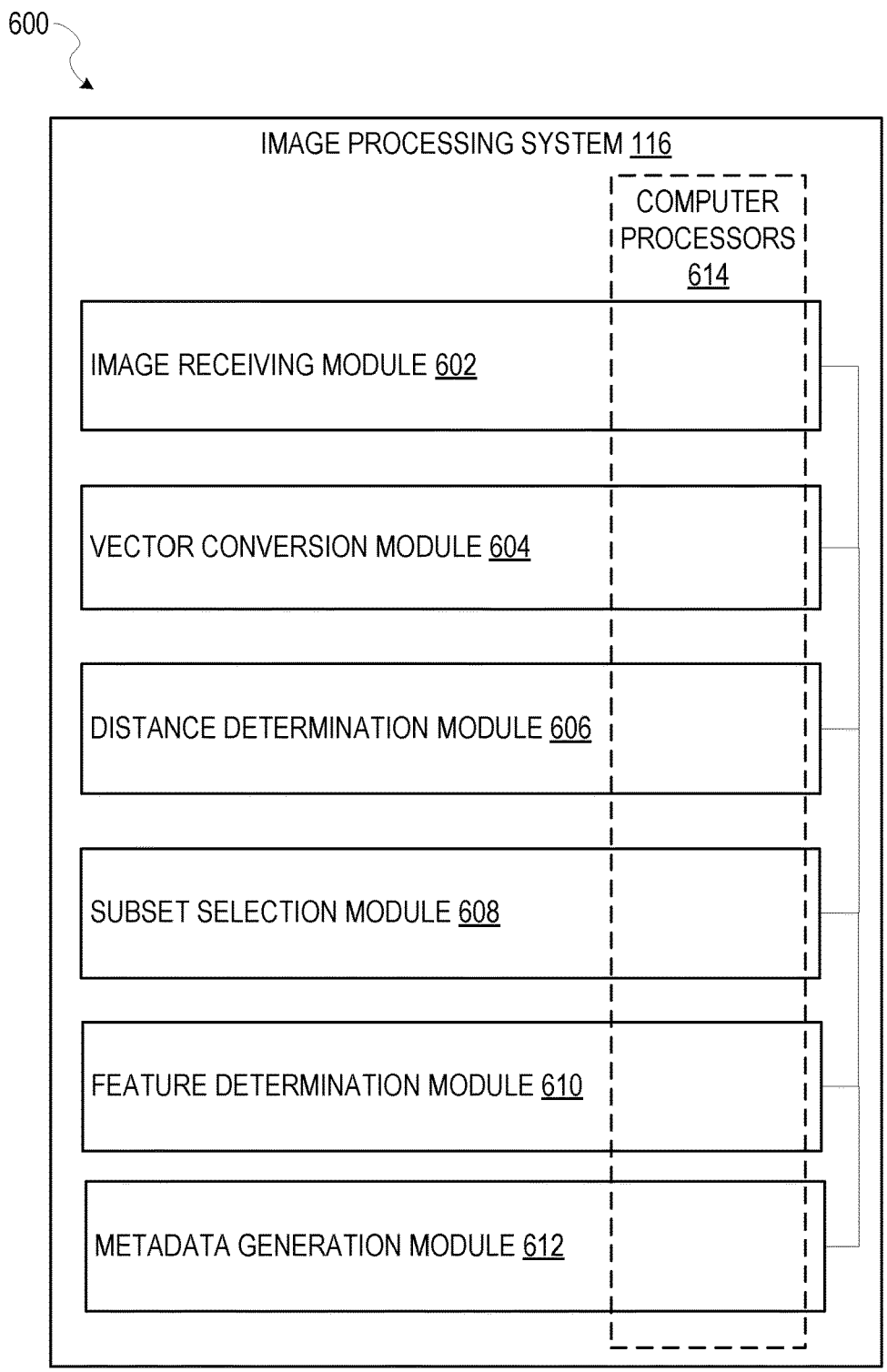
FIG. 6 is a block diagram illustrating various modules of the image processing system, according to certain example embodiments.

FIG. 6 is a block diagram 600 illustrating various modules of the image processing system 116, according to certain example embodiments. The image processing system 116 is shown as including an image receiving module 602, a vector conversion module 604, a distance determination module 606, a subset selection module 608, a feature determination module 610 and a metadata generation module 612. The various modules of the image processing system 116 are configured to communicate with each other (e.g., via a bus, shared memory, or a switch). Any one or more of these modules may be implemented using one or more computer processors 614 (e.g., by configuring such one or more computer processors to perform functions described for that module) and hence may include one or more of the computer processors 614.

Any one or more of the modules described may be implemented using hardware alone (e.g., one or more of the computer processors 614 of a machine (e.g., machine 1500)) or a combination of hardware and software. For example, any described module of the image processing system 116 may physically include an arrangement of one or more of the computer processors 614 (e.g., a subset of or among the one or more computer processors of the machine (e.g., machine 1500)) configured to perform the operations described herein for that module. As another example, any module of the image processing system 116 may include software, hardware, or both, that configure an arrangement of one or more computer processors 614 (e.g., among the one or more computer processors of the machine (e.g., machine 1500)) to perform the operations described herein for that module. Accordingly, different modules of the image processing system 116 may include and configure different arrangements of such computer processors 614 or a single arrangement of such computer processors 614 at different points in time. Moreover, any two or more modules of the image processing system 116 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image receiving module 602 receives images captured by a client device 102. For example, an image is a photograph captured by an optical sensor (e.g., camera) of the client device 102. An image includes one or more real-world features, such as physical objects or features that describe a context of the image.

The vector conversion module 604 converts an image into a vector that represents the image. The resulting vector includes a series of numerical values that represent elements of the image. For example, the numerical values may represent an intensity value of each pixel of the image. Other examples of elements include color components, length, area, circularity, gradient magnitude, gradient direction, or simply the gray-level intensity value, etc. The vector conversion module 604 uses any known algorithm to generate a vector representing an image, although the same algorithm is used to provide vectors that can compared to identify similar vectors.

The distance determination module 606 determines a distance between a target vector (e.g., the vector generated for the image received from the client device 102) and a set of reference vectors representing reference images. The distance determination module 606 uses any known algorithm to determine the distances, such as an algorithm to determine the Euclidian distance between vectors.

The subset selection module 608 selects a subset of the reference images that are similar to the target image. For example, the subset selection module 608 identifies a subset of target images corresponding to reference vectors that are determined to be closest to the target vector. This includes either selecting a predetermined number of the closest target vectors, such as the 5 or 10 vectors that are closest to the target vector, or selecting the reference images that correspond to target vectors that are determined to be within a threshold distance of the target vector.

The feature determination module 610 determines what real-world feature is included in a target image. The feature determination module 610 uses metadata associated with the subset of reference images selected by the subset selection module 608. Each reference image is associated metadata describing what real-world feature is included in the target image, as well as categorization metadata describing one or more categories to which the depicted real-world image belongs. For example, a reference image depicting a shoe may include metadata indicating that the image is of a shoe as well as categorization data describing categories to which the shoe belongs, such as clothing, footwear, etc.

The feature determination module 610 uses the metadata associated with the identified subset of reference images to determine real-world features included in the target image. For example, if the reference images are associated with metadata indicating that the reference images depict a guitar, the feature determination module 610 determines that the target image also depicts a guitar.

In some instance, a reference image identified to be similar to the target image may in fact be of a real-world feature that is different than the real-world feature captured in the target image. To avoid incorrectly identifying real-world features in an image, the feature determination module 610 determines whether a threshold number or threshold percentage of similar reference images provide consistent metadata to determine the real-world feature included in the target image. For example, to determine that a target image is of a shoe, the feature determination module 610 determines whether at least three reference images determined to be similar to the target image include metadata indicating that the reference image is of a shoe. As a result, a single incorrectly identified reference image will not cause the feature determination module 610 to incorrectly identify the real-world feature in the target image.

As another example, the feature determination module 610 determines whether a threshold percentage of the identified reference images include consistent metadata describing the real-world feature in the respective reference images. For example, the feature determination module 610 determines whether at least 50% of the reference images identified as being similar to the target image include consistent metadata to cause the feature determination module 610 to determine that the target image includes the same real-world feature. Thus, if the feature determination module 610 identifies ten reference images as being similar to a target image, and at least five of the ten reference images are identified as being of a guitar, the feature determination module 610 determines that the target image also is of a guitar.

The metadata generation module 612 assigns metadata to a target image. For example, the metadata generation module 612 assigns the metadata associated with the reference images used to identify the real-world feature in the target image to the target image. This includes metadata describing the real-world feature depicted in the reference image as well as categorization metadata for the real-world feature.

Figure 7:
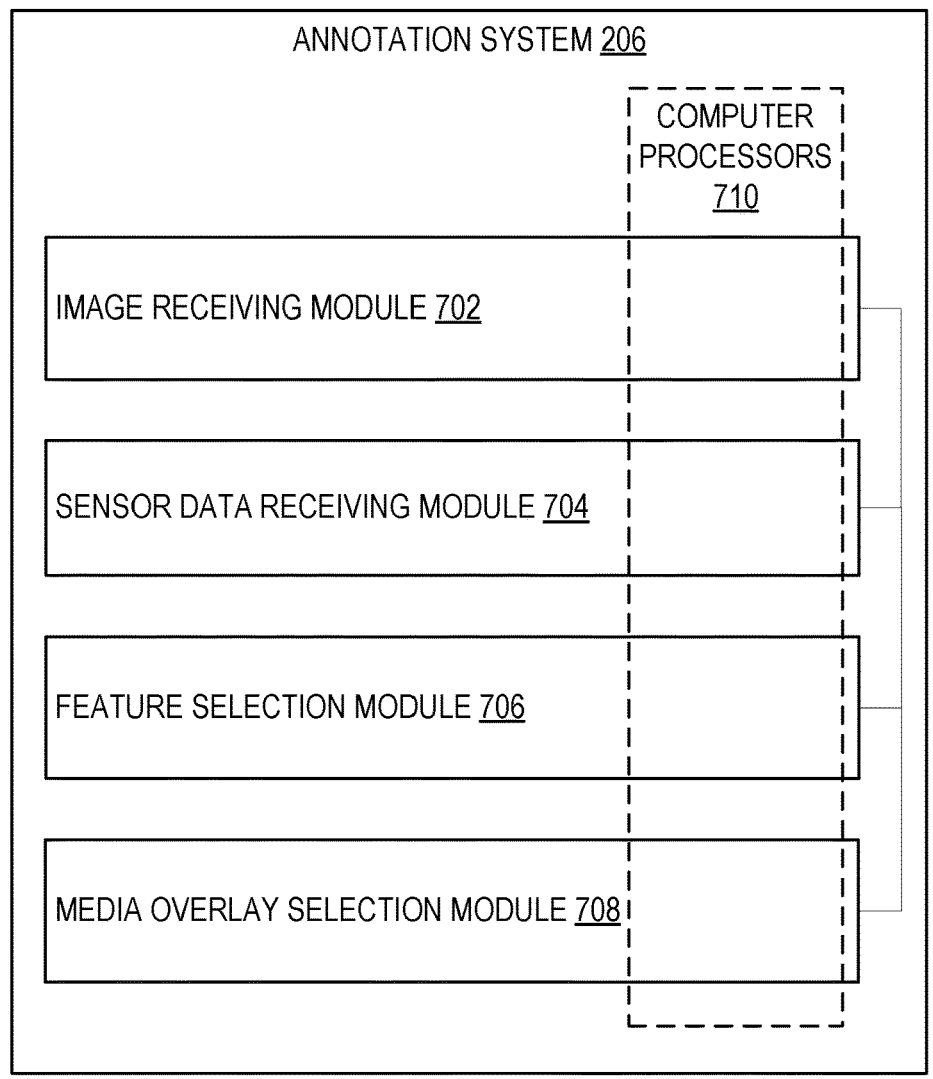
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image receiving module 702, a sensor data receiving module 704, a feature selection module 706, and a media overlay selection module 708. The various modules of the annotation system 206 are configured to communicate with each other (e.g., via a bus, shared memory, or a switch). Any one or more of these modules may be implemented using one or more computer processors 710 (e.g., by configuring such one or more computer processors to perform functions described for that module) and hence may include one or more of the computer processors 710.

Any one or more of the modules described may be implemented using hardware alone (e.g., one or more of the computer processors 710 of a machine (e.g., machine 1500)) or a combination of hardware and software. For example, any described module of the annotation system 206 may physically include an arrangement of one or more of the computer processors 710 (e.g., a subset of or among the one or more computer processors of the machine (e.g., machine 1500)) configured to perform the operations described herein for that module. As another example, any module of the annotation system 206 may include software, hardware, or both, that configure an arrangement of one or more computer processors 710 (e.g., among the one or more computer processors of the machine (e.g., machine 1500)) to perform the operations described herein for that module. Accordingly, different modules of the annotation system 206 may include and configure different arrangements of such computer processors 710 or a single arrangement of such computer processors 710 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image receiving module 702 receives images captured by a client device 102. For example, an image is a photograph captured by an optical sensor (e.g., camera) of the client device 102. An image includes one or more real-world features, such as physical objects or features that describe a context of the image. In some embodiments, an image includes metadata describing the image. For example, the image includes metadata describing one or more real-world features captured by the image as well as categorization data describing categories associated with the one or more real-world features captured by the image. The metadata also describes the appearance of the real-world features within the image. For example, the metadata describes a location of the real-world features in the image, such as whether the real-world feature is positioned near the edge of the image or near the center of the image. The metadata also describes the size of each real-world feature in relation to the image or the other real-world features captured in the image. For example, the metadata indicates a percentage of the image that each real-world feature consumes. As another example, the metadata indicates a ranking of each real-world feature based on its size compared to the other real-world features.

The metadata can be added to the image by the image processing system 116 prior to the image having been received by the image receiving module 702. Alternatively, the image receiving module 702 can provide the image to the image processing system 116 and the image processing system identifies the real-world features in the image and adds corresponding metadata to the image. The image processing system 116 then provides the image back to the image receiving module.

The sensor data receiving module 704 receives sensor data from a client device 102. Sensor data is any type of data captured by a sensor of the client device 102. For example, the sensor data includes data describing motion of the client device 102 gathered by a gyroscope, GPS, or other sensor of the client device 102 that describes a current geographic location and/or movement of the client device 102. As another example, sensor data may include temperature data indicating a current temperature as detected by a sensor of the client device 102. As another example, the sensor data may include light sensor data indicating whether the client device 102 is in a dark or bright environment.

The feature selection module 706 selects one or more real-world features captured by an image to be used as a basis for selecting media overlays for the image. For example, in instances where an image includes a relatively high number of real-world features, the feature selection module 706 selects a subset of the real-world features to be used as a basis for selecting media overlays for the image. The feature selection module 706 selects the subset of real-world features based on one or more factors, such as the size of the real-world features, the location of the real world features within the image, a distinctiveness or commonness level of the real-world features, etc. For example, the feature selection module 706 selects real-world features that are relatively larger or that take up a larger portion of the image, which may indicate that the real-world feature is a focal point of the image. As another example, the feature selection module 706 selects real-world features located near the center of the image, which may indicate that the real-world feature is a focal point of the image. As another example, the feature selection module 706 selects real-world features that are relatively more unique (e.g., distinct) and less commonly captured in images. Conversely, the feature selection module 706 may select real-world features that are common.

The media overlay selection module 708 uses the real-world features selected by the feature selection module 706 to select one or more media overlays for the image. The media overlay selection module 708 uses the metadata describing each real-world feature to identify media overlays in database 120 for the image. In some embodiments, the media overlay selection module 708 selects media overlays that depict the real-world features captured in the image. For example, the media overlay selection module 708 selects media overlays depicting a guitar for an image of a guitar.

As another example, the media overlay selection module 708 selects media overlays that are related to the real-world features. For example, the media overlay selection module 708 determines a category of the real-world feature, such as a general, specific, or contextual category. The media overlay selection module 708 then select media overlays that are included in the determined category.

In some embodiments, the media overlay selection module 708 selects media overlays based on the real-world features included in the image as well as sensor data received from the client device 102. For example, the media overlay selection module 708 uses sensor data such as location data, motion data, etc., along with the metadata describing the real-world features, to determine a category, such as a contextual category, describing the image. The media overlay selection module 708 then selects media overlays that are included in the determined category.

The media overlay selection module 708 provides the selected media overlays to the client device 102. A user of the client device then uses one or more of the media overlays to annotate the image. For example, the user can use the client device 102 to cause a media overlay to be appended over a user selected portion of the image.

Figure 8:
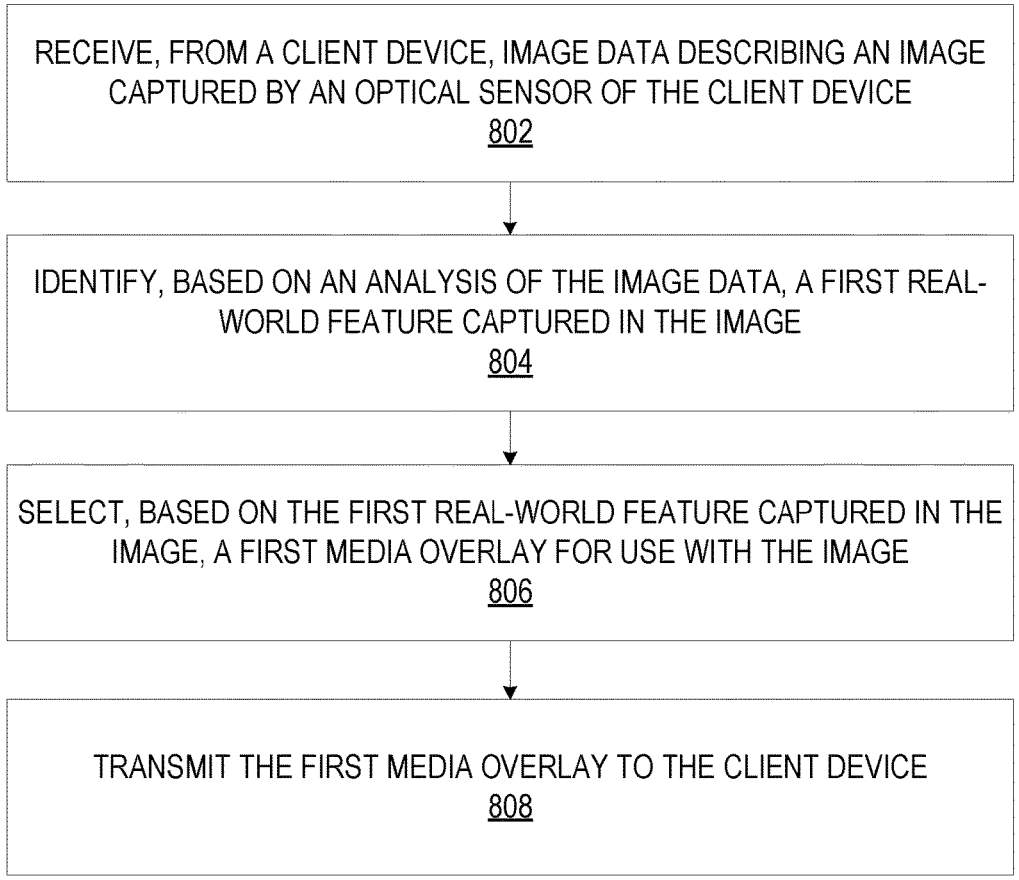
FIG. 8 is a flowchart illustrating a method to select a filtered set of media overlays based on real-world features identified in an image, according to certain example embodiments.

FIG. 8 is a flowchart illustrating a method 800 to select a filtered set of media overlays based on real-world features identified in an image, according to certain example embodiments. The method 800 may be embodied in computer-readable instructions for execution by one or more computer processors such that the operations of the method 800 may be performed in part or in whole by the messaging server system 108; accordingly, the method 800 is described below by way of example with reference thereto. However, it shall be appreciated that at least some of the operations of the method 800 may be deployed on various other hardware configurations and the method 800 is not intended to be limited to the messaging server system 108.

At operation 802, the messaging server system 108 receives, from a client device 102, image data describing an image captured by an optical sensor of the client device 102. In addition to the image data, the messaging server system 108 also receives contextual data captured by a sensor of the client device 102, such as a location or movement sensor.

At operation 804, the image processing system 116 identifies, based on an analysis of the image data, a first real-world feature captured in the image. In some embodiments, the first real-world feature is a physical item captured in the image.

At operation 806, the annotation system 206 selects, based on the first real-world feature captured in the image, a first media overlay for use with the image. The first media overlay is a digital image that can be annotated over the image. In some embodiments, the media overlay selection module 708 identifies a set of one or more media overlays that depict the physical item captured in the image. The media overlay selection module 708 selects the first media overlay from the set of one or more media overlays that depict the physical item captured in the image.

In some embodiments, the media overlay selection module 708 identifies, based on the physical item captured in the image, a contextual category of the image. The media overlay selection module selects the first media overlay from a set of media overlays associated with the contextual category.

In some embodiments, the media overlay selection module 708 determines, based on the contextual data captured by the sensor of the client device and the first real-world feature, a contextual category of the image. The media overlay selection module 708 selects the first media overlay from a set of media overlays associated with the contextual category.

At operation 808, the annotation system 206 transmits the first media overlay to the client device 102. After the first media overlay is received by the client device 102, a user of the client device 102 can cause the first media overlay to be appended over a user selected portion of the image, yielding an annotated image.

Figure 9:
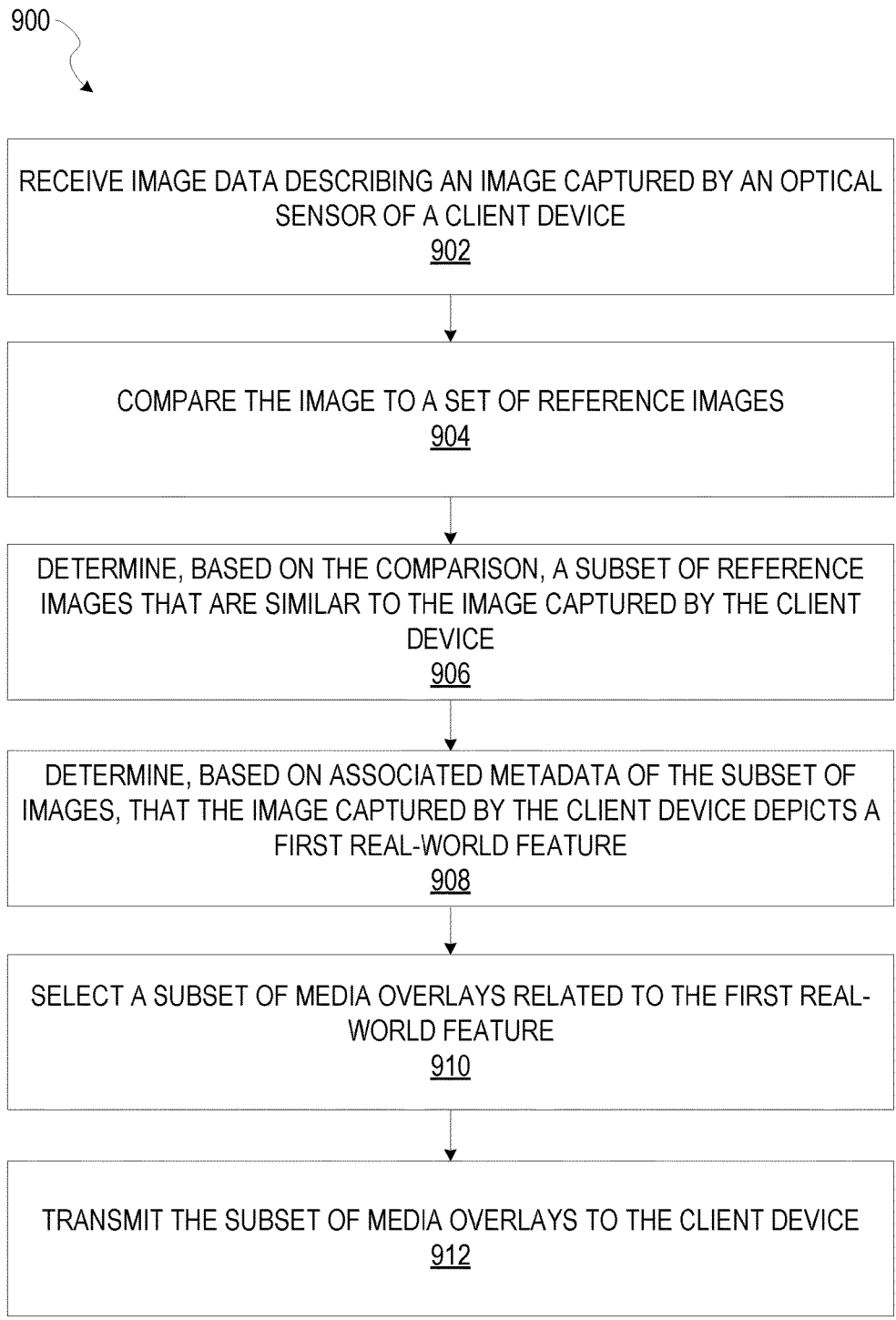
FIG. 9 is a flowchart illustrating another method to select a filtered set of media overlays based on real-world features identified in an image, according to certain example embodiments.

FIG. 9 is a flowchart illustrating another method 900 to select a filtered set of media overlays based on real-world features identified in an image, according to certain example embodiments. The method 900 may be embodied in computer-readable instructions for execution by one or more computer processors such that the operations of the method 900 may be performed in part or in whole by the messaging server system 108; accordingly, the method 900 is described below by way of example with reference thereto. However, it shall be appreciated that at least some of the operations of the method 900 may be deployed on various other hardware configurations and the method 900 is not intended to be limited to the messaging server system 108.

At operation 902, the image receiving module 602 receives image data describing an image captured by an optical sensor of a client device 102. For example, an image is a photograph captured by an optical sensor (e.g., camera) of the client device 102. An image includes one or more real-world features, such as physical objects or features that describe a context of the image.

At operation 904, the image processing system 116 compares the image to a set of references images. The reference images depict known real-world features. Each reference image includes metadata describing the real-world image depicted by the respective reference image. In some embodiments, the image processing system 116 uses vectors representing the images to compare the image to the reference images. For example, the image processing system 116 determines the Euclidian distance between the vectors.

At operation 906, the image processing system 116 determines, based on the comparison, a subset of reference images that are similar to the image captured by the client device. For example, the image processing system 116 determines the subset of reference images that are represented by vectors that are closest to the vector representing the image received from the client device 102.

At operation 908, the image processing system 116 determines, based on associated metadata of the subset of images, that the image captured by the client device 102 depicts a first real-world feature. For example, the image processing system 116 determines what real-world feature is most commonly depicted by the subset of reference images and determines that the image received from the client device 102 depicts the same real-world feature.

At operation 910, the annotation system 206 selects a subset of media overlays related to the first-real world feature. The annotation system 206 uses metadata describing the media overlays to identify media overlays that depict the same real-world image and/or related real-world features. For example, the annotation system 206 selects media overlays that depict real-world features that are included in a same category as the real-world feature depicted in the image received from the client device 102.

At operation 912, the annotation system transmits the subset of media overlays to the client device 102. A use of the client device 102 can then select to annotate the image with one or more of the received media overlays.

Figure 10:
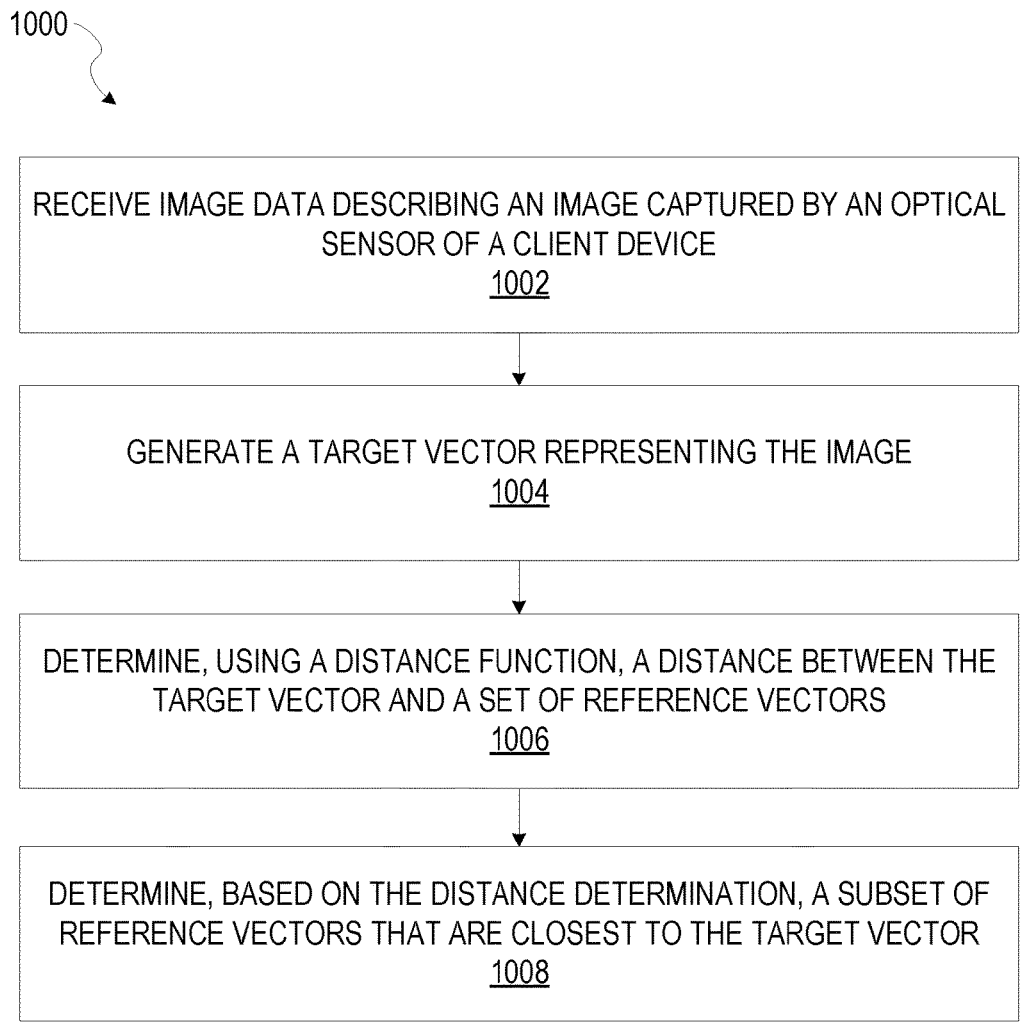
FIG. 10 is a flowchart illustrating a method to determine a subset of reference images that are similar to a target image, according to certain example embodiments.

FIG. 10 is a flowchart illustrating a method 1000 to determine a subset of reference images that are similar to a target image, according to certain example embodiments. The method 1000 may be embodied in computer-readable instructions for execution by one or more computer processors such that the operations of the method 1000 may be performed in part or in whole by the messaging server system 108; accordingly, the method 1000 is described below by way of example with reference thereto. However, it shall be appreciated that at least some of the operations of the method 1000 may be deployed on various other hardware configurations and the method 1000 is not intended to be limited to the messaging server system 108.

At operation 1002, the image receiving module 602 receives image data describing an image captured by an optical sensor of a client device 102. For example, an image is a photograph captured by an optical sensor (e.g., camera) of the client device 102. An image includes one or more real-world features, such as physical objects or features that describe a context of the image.

At operation 1004, the vector conversion module 604 generates a target vector representing the image. The resulting vector includes a series of numerical values that represent elements of the image. For example, the numerical values may represent an intensity value of each pixel of the image. Other examples of elements include color components, length, area, circularity, gradient magnitude, gradient direction, or simply the gray-level intensity value, etc. The vector conversion module 604 uses any known algorithm to generate a vector representing an image, although the same algorithm is used to provide vectors that can compared to identify similar vectors.

At operation 1006, the distance determination module 606 determines, using a distance function, a distance between the target vector and a set of reference vectors. The distance determination module 606 uses any known algorithm to determine the distances, such as an algorithm to determine the Euclidian distance between vectors.

At operation 1008, the subset selection module 608 determines, based on the distance determination, a subset of reference vectors that are closest to the target vector. For example, the subset selection module 608 identifies a subset of target images corresponding to reference vectors that are determined to be closest to the target vector. This includes either selecting a predetermined number of the closest target vectors, such as the 5 or 10 vectors that are closest to the target vector, or selecting the reference images that correspond to target vectors that are determined to be within a threshold distance of the target vector.

FIG. 11 is a flowchart illustrating a method 1100 to determine the real-world feature captured in an image, according to certain example embodiments. The method 1100 may be embodied in computer-readable instructions for execution by one or more computer processors such that the operations of the method 1100 may be performed in part or in whole by the messaging server system 108; accordingly, the method 1100 is described below by way of example with reference thereto. However, it shall be appreciated that at least some of the operations of the method 1100 may be deployed on various other hardware configurations and the method 1100 is not intended to be limited to the messaging server system 108.

At operation 1102, the feature determination module 608 determines a percentage of the reference images that are associated with metadata indicating that the respective reference images depict the same real-world feature. The reference images are selected by the image processing system 116 based on a target image. The feature determination module 608 uses metadata associated with the reference images to determine what real-world feature is depicted in the reference images and determines the largest set of reference images that depict the same real-world image. The feature determination module 608 then determines what percentage of the reference images selected based on the target image depict the same real-world feature.

At operation 1104, the media overlay selection module 708 compares the percentage to a threshold percentage. The threshold percentage is a predetermined threshold used to determine if the reference images depict the same real-world feature as the image.

At operation 1106, the media overlay selection module 708 determines that the percentage meets or exceeds the threshold percentage. This indicates that the real-world feature in the image is the same as the real-world feature depicted in the reference images.

Figure 12:
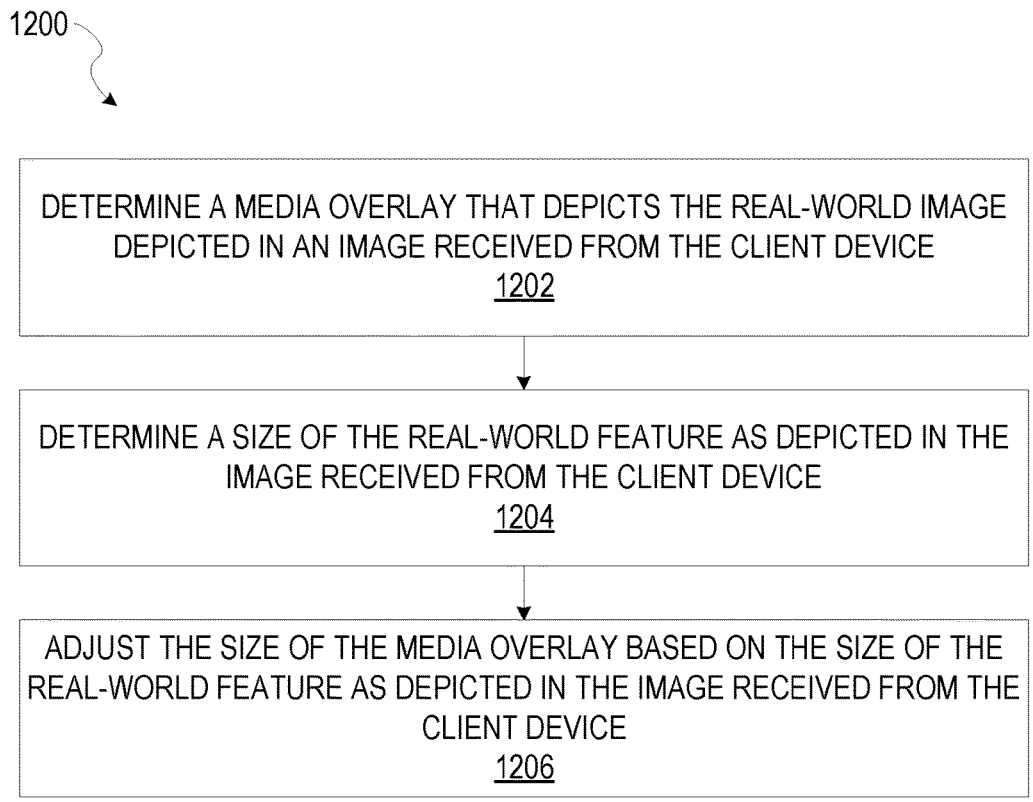
FIG. 12 is a flowchart illustrating a method to select a media overlay, according to certain example embodiments.

FIG. 12 is a flowchart illustrating a method 1200 to select a media overlay, according to certain example embodiments. The method 1200 may be embodied in computer-readable instructions for execution by one or more computer processors such that the operations of the method 1200 may be performed in part or in whole by the messaging server system 108; accordingly, the method 1200 is described below by way of example with reference thereto. However, it shall be appreciated that at least some of the operations of the method 1200 may be deployed on various other hardware configurations and the method 1200 is not intended to be limited to the messaging server system 108.

At operation 1202, the media overlay selection module 708 determines a media overlay that depicts the real-world feature depicted in an image received from the client device 102. For example, the media overlay selection module uses metadata associated with the image to determine what real-world feature is depicted in the image. The media overlay selection module 708 then uses metadata associated with the media overlays to identify a media overlay that depicts the same real-world image.

At operation 1204, the media overlay selection module 708 determines a size of the real-world feature as depicted in the image received from the client device. The size of the image as depicted in the image indicates a size at which the real-world feature will presented when displayed by a client device 102. The image processing system 116 determines the size of the real-world feature as depicted in the image and associates metadata with the image identifying the size. The media overlay selection module 708 uses the metadata to determine the size of the real-world feature.

At operation 1206, the media overlay selection module 708 adjusts the size of the media overlay based on the size of the real-world feature as depicted in the image received from the client device. For example, the media overlay selection module 708 adjusts the size so that the media overlay is presented at the same or similar size as the real-world image on the display of the client device 102. A user can place the media overlay over the real-world feature in the image to annotate the image. For example, the user can place a media overlay depicting a soda can over a soda can captured in the image.

Figure 13:
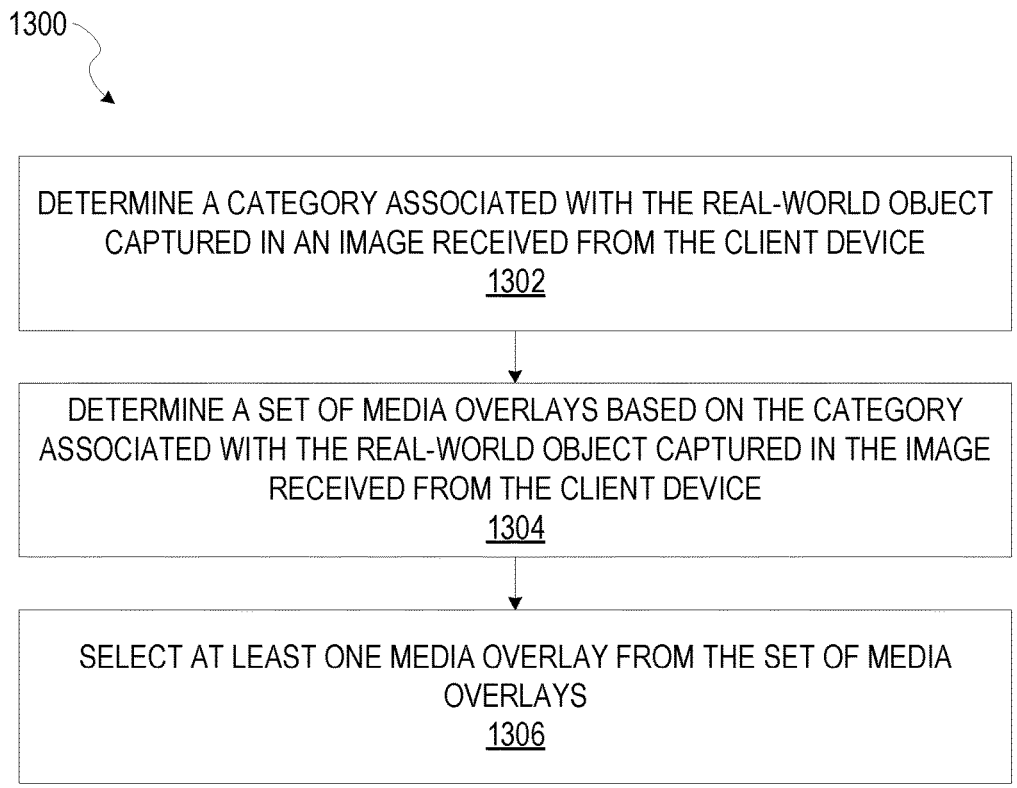
FIG. 13 is a flowchart illustrating another method to select a media overlay, according to certain example embodiments.

FIG. 13 is a flowchart illustrating another method 1300 to select a media overlay, according to certain example embodiments. The method 1300 may be embodied in computer-readable instructions for execution by one or more computer processors such that the operations of the method 1300 may be performed in part or in whole by the messaging server system 108; accordingly, the method 1300 is described below by way of example with reference thereto. However, it shall be appreciated that at least some of the operations of the method 1300 may be deployed on various other hardware configurations and the method 1300 is not intended to be limited to the messaging server system 108.

At operation 1302, the media overlay selection module 708 determines a category associated with the real-world object captured in an image received from the client device 102. The real-world object is associated with metadata describing the real-world object captured in the image. The metadata is associated with the image by the image processing system 116. The metadata includes categorization metadata describing one or more categories to which the real-world feature belongs. The media overlay selection module 708 uses the metadata to determine the category associated with the real-world object.

At operation 1304, the media overlay selection module 708 determines a set of media overlays based on the category associated with the real-world object captured in the image received from the client device 102. Available media overlays are associated with metadata describing each respective media overlay. For example, the media overlays are associated with metadata describing an image depicted by the media overlay, as well as categorization data describing a category to which the media overlay belongs. For example, a media overlay depicting a shoe is associated with metadata indicating that the media overlay depicts a shoe, as well as categorization data for the shoe, such as clothing, footwear, Nike, etc.

The media overlay selection module 708 uses the metadata to identify a subset of media overlays that are included in the same category as the image. For example, if the image is of a shoe, the media overlay selection module 708 identifies media overlays that are categorized as footwear.

At operation 1306, the media overlay selection module 708 selects at least one media overlay from the set of media overlays. The media overlay selection module 708 selects the media overlays based on any number of factors. For example, the media overlay selection module 708 selects media overlays based on popularity (e.g., how often they are used to annotate an image), how similar the media overlay is to the image (e.g., a media overlay that depicts the real-world feature), etc.

Software Architecture

Figure 14:
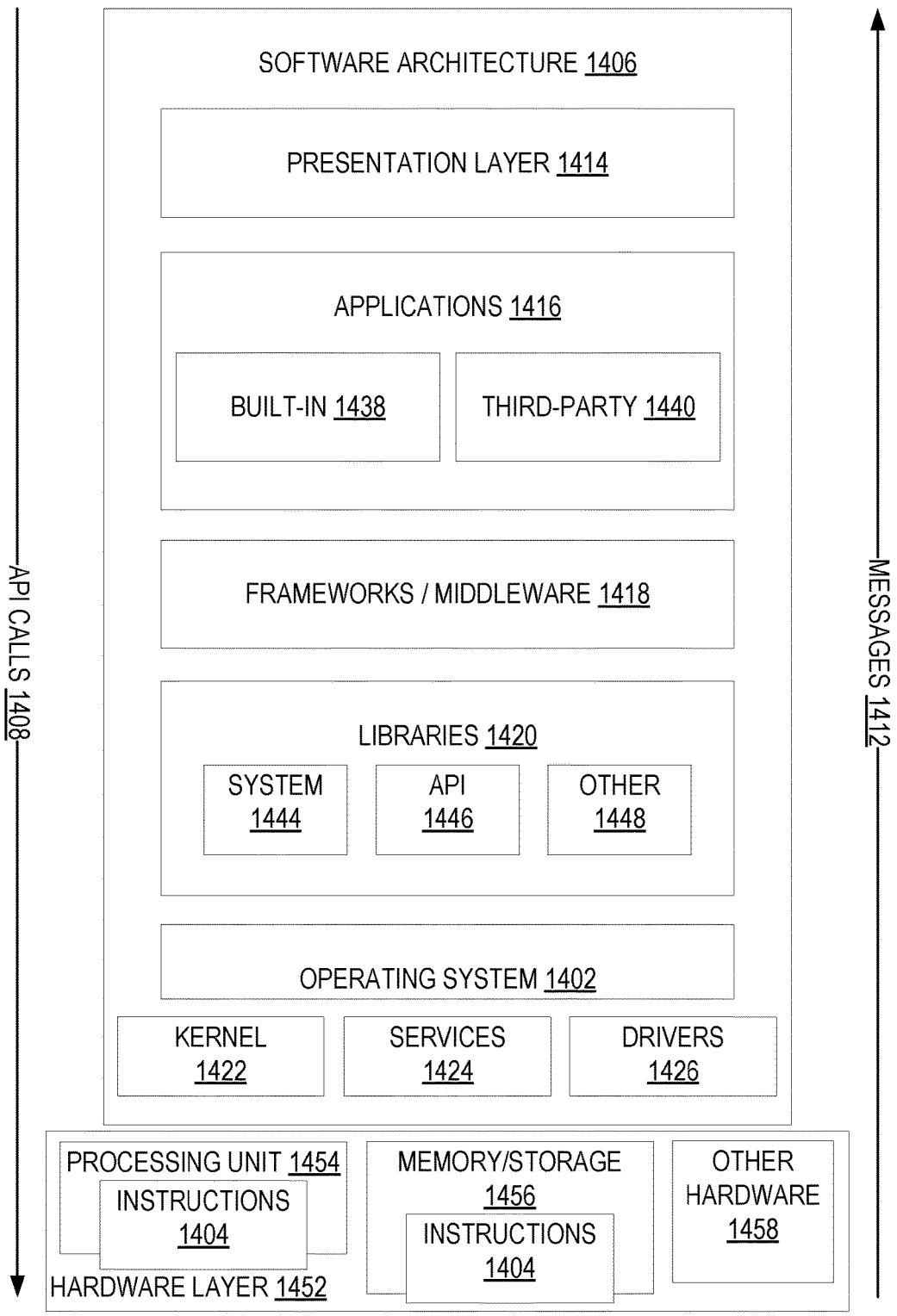
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as machine 1500 of FIG. 15 that includes, among other things, processors 1504, memory 1514, and (input/output) I/O components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components, and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke API calls 1408 through the software stack and receive a response as in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be used by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424 and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user.

Figure 15:
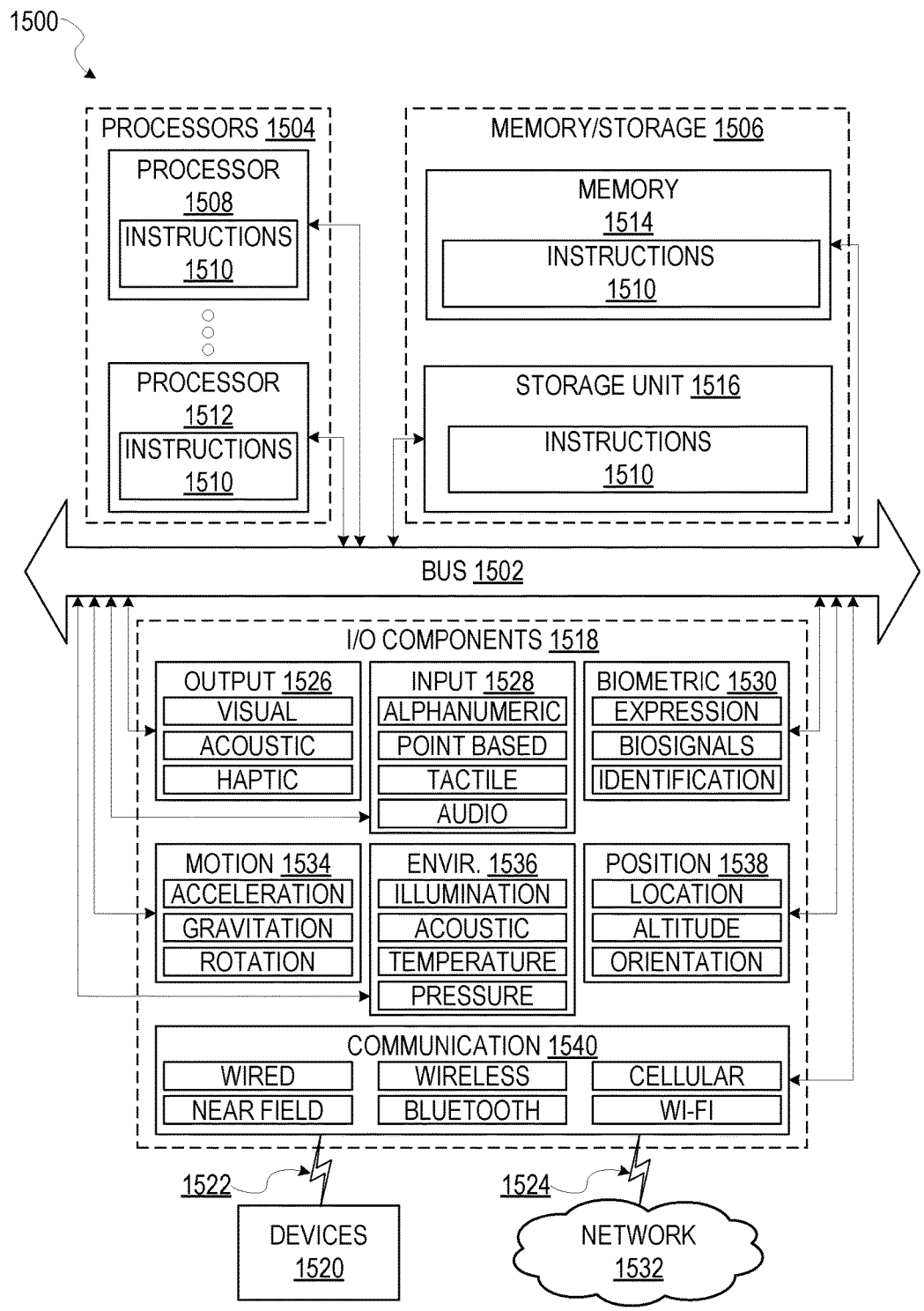
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1524 and coupling 1522, respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may be, for example, a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
    receiving, from a client device, image data describing an image captured by an optical sensor of the client device;
    comparing, based on the image data, the image captured by the optical sensor of the client device to a set of reference images, yielding a comparison, each reference image from the set of reference images including associated metadata describing a real-world feature depicted by the respective reference image;
    determining, based on the comparison, a subset of reference images that are similar to the image captured by the optical sensor of the client device;
    determining, based on associated metadata of the subset of reference images, that the image captured by the optical sensor of the client device depicts a first real-world feature;
    receiving, from the client device, motion data representing movement of the client device;
    selecting, from a set of media overlays, a subset of media overlays related to the first real-world feature, the subset of media overlays selected based on metadata associated with each media overlay that describes the respective media overlay and based on the motion data representing movement of the client device, wherein each media overlay is a digital image that can be annotated over the image captured by the optical sensor of the client device; and
    transmitting the subset of media overlays to the client device.

2. The method of claim 1, wherein comparing the image captured by the optical sensor of the client device to the set of reference images comprises:
    generating, based on the image data, a target vector representing the image captured by the optical sensor of the client device, the target vector including numeric values describing features of the image captured by the optical sensor of the client device; and
    determining, using a distance function, a distance between the target vector and a set of reference vectors, yielding a distance determination, each reference vector from the set of reference vectors representing a respective reference image from the set of reference images and including numeric values describing features of the respective reference image.

3. The method of claim 2, wherein determining the subset of reference images that are similar to the image captured by the optical sensor of the client device comprises:
    determining, based on the distance determination, a subset of reference vectors that are closest to the target vector, the subset of reference vectors representing the subset of reference images that are similar to the image captured by the optical sensor of the client device.

4. The method of claim 1, wherein determining that the image captured by the optical sensor of the client device depicts a first real-world feature comprises:
    determining, based on associated metadata of the subset of reference images, a percentage of the subset of reference images associated with metadata indicating that the respective reference image depicts an image of the first real-world feature;
    comparing the percentage to a threshold percentage; and
    in response to determining the percentage meets or exceeds the threshold percentage, determining that the image depicts the first real-world feature.

5. The method of claim 1, wherein selecting a subset of media overlays related to the first real-world feature comprises:
    determining, based on metadata associated with each media overlay that describes the respective media overlay, media overlays that depict the first real-world feature; and
    selecting at least one media overlay from the set of media overlays based on popularity, wherein the popularity indicates how often each of the media overlays in the set are used to annotate an image.

6. The method of claim 1, further comprising:
    determining, based on associated metadata of the subset of reference images, a number that represents how many of the subset of reference images is associated with metadata indicating that the respective reference image depicts an image of the first real-world feature;
    comparing the number to a threshold;
    in response to determining the number meets or exceeds the threshold, determining that the image depicts the first real-world feature;
    determining a size of the first real-world feature as depicted in the first image; and
    adjusting a size of a first media overlay that depicts the first real-world feature based on the size of the first real-world feature as depicted in the first image.

7. The method of claim 1, wherein selecting a subset of media overlays related to the first real-world feature comprises:
    determining a category associated with the first-real world object; and
    determining, based on metadata associated with each media overlay that describes the respective media overlay, media overlays that depict real-world features that are associated with the category.

8. The method of claim 1, further comprising:
    receiving, from the client device, contextual data captured by a sensor of the client device.

9. The method of claim 8, wherein selecting a subset of media overlays related to the first real-world feature comprises:
    determining, based on the first real-world feature and the contextual data received from the client device and, a contextual category of the image; and
    determining, based on metadata associated with each media overlay that describes the respective media overlay, media overlays that depict real-world features that are associated with the contextual category.

10. The method of claim 1, wherein after the subset of media overlays are received by the client device:
the client device receives user input designating a place within the image to position a first overlay from the subset of media overlays; and
the client device, in response to receiving the user input, causes the first media overlay to be appended over the designated place within the image, yielding an annotated image.

11. A system comprising:
one or more computer processors; and
one or more computer-readable mediums storing instructions that, when executed by the one or more computer processors, cause the system to perform operations comprising:
receiving, from a client device, image data describing an image captured by an optical sensor of the client device;
comparing, based on the image data, the image captured by the optical sensor of the client device to a set of reference images, yielding a comparison, each reference image from the set of reference images including associated metadata describing a real-world feature depicted by the respective reference image;
determining, based on the comparison, a subset of reference images that are similar to the image captured by the optical sensor of the client device;
determining, based on associated metadata of the subset of reference images, that the image captured by the optical sensor of the client device depicts a first real-world feature;
receiving, from the client device, motion data representing movement of the client device;
selecting, from a set of media overlays, a subset of media overlays related to the first real-world feature, the subset of media overlays selected based on metadata associated with each media overlay that describes the respective media overlay and based on the motion data representing movement of the client device, wherein each media overlay is a digital image that can be annotated over the image captured by the optical sensor of the client device; and
transmitting the subset of media overlays to the client device.

12. The system of claim 11, wherein comparing the image captured by the optical sensor of the client device to the set of reference images comprises:
generating, based on the image data, a target vector representing the image captured by the optical sensor of the client device, the target vector including numeric values describing features of the image captured by the optical sensor of the client device; and
determining, using a distance function, a distance between the target vector and a set of reference vectors, yielding a distance determination, each reference vector from the set of reference vectors representing a respective reference image from the set of reference images and including numeric values describing features of the respective reference image.

13. The system of claim 12, wherein determining the subset of reference images that are similar to the image captured by the optical sensor of the client device comprises:
determining, based on the distance determination, a subset of reference vectors that are closest to the target vector, the subset of reference vectors representing the subset of reference images that are similar to the image captured by the optical sensor of the client device.

14. The system of claim 11, wherein determining that the image captured by the optical sensor of the client device depicts a first real-world feature comprises:
determining, based on associated metadata of the subset of reference images, a percentage of the subset of reference images associated with metadata indicating that the respective reference image depicts an image of the first real-world feature;
comparing the percentage to a threshold percentage; and
in response to determining the percentage meets or exceeds the threshold percentage, determining that the image depicts the first real-world feature.

15. The system of claim 11, wherein selecting a subset of media overlays related to the first real-world feature comprises:
determining, based on metadata associated with each media overlay that describes the respective media overlay, media overlays that depict the first real-world feature; and
selecting at least one media overlay from the set of media overlays based on popularity, wherein the popularity indicates how often each of the media overlays in the set are used to annotate an image.

16. The system of claim 11, the operations further comprising:
determining, based on associated metadata of the subset of reference images, a number that represents how many of the subset of reference images is associated with metadata indicating that the respective reference image depicts an image of the first real-world feature;
comparing the number to a threshold;
in response to determining the number meets or exceeds the threshold, determining that the image depicts the first real-world feature;
determining a size of the first real-world feature as depicted in the first image; and
adjusting a size of a first media overlay that depicts the first real-world feature based on the size of the first real-world feature as depicted in the first image.

17. The system of claim 11, wherein selecting a subset of media overlays related to the first real-world feature comprises:
determining a category associated with the first-real world object; and
determining, based on metadata associated with each media overlay that describes the respective media overlay, media overlays that depict real-world features that are associated with the category.

18. The system of claim 11, the operations further comprising:
receiving, from the client device, contextual data captured by a sensor of the client device.

19. The system of claim 18, wherein selecting a subset of media overlays related to the first real-world feature comprises:
determining, based on the first real-world feature and the contextual data received from the client device, a contextual category of the image; and
determining, based on metadata associated with each media overlay that describes the respective media overlay, media overlays that depict real-world features that are associated with the contextual category.

20. A non-transitory computer-readable medium storing instructions that, when executed by one or more computer processors of a computing device, cause the computing device to perform operations comprising:
  receiving, from a client device, image data describing an image captured by an optical sensor of the client device;
  comparing, based on the image data, the image captured by the optical sensor of the client device to a set of reference images, yielding a comparison, each reference image from the set of reference images including associated metadata describing a real-world feature depicted by the respective reference image;
  determining, based on the comparison, a subset of reference images that are similar to the image captured by the optical sensor of the client device;
  determining, based on associated metadata of the subset of reference images, that the image captured by the optical sensor of the client device depicts a first real-world feature;
  receiving, from the client device, motion data representing movement of the client device;
  selecting, from a set of media overlays, a subset of media overlays related to the first real-world feature, the subset of media overlays selected based on metadata associated with each media overlay that describes the respective media overlay and based on the motion data representing movement of the client device, wherein each media overlay is a digital image that can be annotated over the image captured by the optical sensor of the client device; and
  transmitting the subset of media overlays to the client device.

* * * * *

UNITED STATES PATENT AND TRADEMARK OFFICE
CERTIFICATE OF CORRECTION

PATENT NO. : 10,482,327 B1  
APPLICATION NO. : 15/801853  
DATED : November 19, 2019  
INVENTOR(S) : Ouimet et al.

Page 1 of 1

It is certified that error appears in the above-identified patent and that said Letters Patent is hereby corrected as shown below:

In the Claims

In Column 30, Line 51, in Claim 7, delete "first-real word" and insert --first real-word-- therefor In Column 32, Line 46, in Claim 17, delete "first-real word" and insert --first real-word-- therefor Signed and Sealed this  
Eighth Day of December, 2020

Andrei Iancu  
*Director of the United States Patent and Trademark Office*